United States Patent [19]
Reeve

[11] Patent Number: 5,788,379
[45] Date of Patent: Aug. 4, 1998

[54] HIGH PRECISION PLATE BEARING STRUCTURES AND METHODS OF ASSEMBLY

[75] Inventor: Paul M. Reeve, Redwood City, Calif.

[73] Assignee: Zevatech, Inc., Morrisville, N.C.; a part interest

[21] Appl. No.: 827,913

[22] Filed: Apr. 8, 1997

[51] Int. Cl.$^6$ .................................. F16C 29/02
[52] U.S. Cl. ................................. 384/41; 384/42
[58] Field of Search .................... 384/41, 42, 40, 384/38, 26

[56] References Cited

U.S. PATENT DOCUMENTS

| | | |
|---|---|---|
| 4,080,009 | 3/1978 | Marathe et al. ................... 384/12 |
| 4,378,134 | 3/1983 | Eddy . |
| 5,380,099 | 1/1995 | Teramachi ........................ 384/45 |
| 5,488,771 | 2/1996 | Devitt et al. ................. 29/898.02 |
| 5,564,188 | 10/1996 | Akasako et al. ................. 384/15 |

*Primary Examiner*—Lenard A. Footland
*Attorney, Agent, or Firm*—D'Alessandro & Ritchie

[57] ABSTRACT

A class of bearing plate structures for slidable engagement with a reference bar include a plurality of plates each having a precision machined surface for sliding engagement with a corresponding precision machined surface of the reference bar. The use of a curable hardening bonding material to attach adjacent portions of the plates together allows angles between adjacent plates and the operating gap between the bearing plate structure and the reference bar to be easily set and fixed with reference to the reference bar.

5 Claims, 4 Drawing Sheets

HIGH PRECISION PLATE BEARING STRUCTURES AND METHODS OF ASSEMBLY

STATEMENT OF RELATED APPLICATIONS

This application relates to similar subject matter disclosed and claimed in co-pending U.S. patent application Ser. No. 08/827,922 filed on even date herewith with attorney docket no. ZEVA-005 and submitted in the names of inventors Paul M. Reeve, non-assignor, and Edison T. Hudson, assignor to Zevatech, Inc., a Delaware Corporation. This related application is hereby incorporated herein by reference as if set forth fully herein.

BACKGROUND OF THE INVENTION

1. Field of the Invention

The present invention is directed to the field of plate bearings. More particularly, the present invention is directed to plate bearing structures which can be manufactured with a minimum of critical machining. The incorporation of a curable bonding material in the plate bearing assembly permits replication of angular features without precise machining of any portion of the assembly other than surfaces. The optional incorporation of a release agent on a surface of the curable bonding material permits disassembly of the plate bearing structure in order to effect repair without additional structural elements, and then reassembly without new machining or grinding required in most cases.

2. The Background Art

Bearing plate assemblies are well known in the art. Such devices typically form a structure which slides along a "guide bar", "ways", "ways bar" or "reference bar". Equipment attached to the sliding bearing plate structure or "slider" slides along the reference bar. It is generally desirable to minimize friction between the reference bar and the sliding bearing plate structure so as to reduce wear and tear on the reference bar and bearing plate structure as well as to reduce the energy required to drive the bearing plate structure back and forth along the reference bar. Friction can be lessened by placing fluid manifolds in the bearing plate structure surfaces which are adjacent surfaces of the reference bar so that they supply a fluid pressure to hold the bearing plate a small distance or "gap" from the reference bar or guide surface.

A typical structure comprising a box-type bearing plate assembly disposed about a reference bar is depicted in FIG. 1. Turning now to FIG. 1, reference bar 10 is a square or rectangular cross-section bar having surfaces 12a, 12b, 12c and 12d ground flat to precision tolerances deemed necessary for the desired application and having corner angles 14a, 14b, 14c and 14d ground to high angular precision. Bearing plate assembly 16 is formed of four bearing plates 18a, 18b, 18c and 18d. The internal surfaces 20a, 20b, 20c and 20d of bearing plates 18a–18d which abut corresponding reference bar surfaces 12a, 12b, 12c and 12d, respectively, must be machined to fine tolerances so that they precisely match corresponding surfaces of reference bar 10 and so that the supplementary angles 22a, 22b, 22c and 22d formed by adjacent plates form highly precise component angles with respective corresponding reference bar corner angles 14a, 14b, 14c and 14d. Typically, adjacent bearing plates are bolted or screwed together, as shown, for example, with bolt 24 (only one bolt is shown for clarity—but typically a row of bolts would fasten each joint between respective adjacent or abutting bearing plates). The gap between the reference bar and the bearing plate assembly is usually set for one pair of faces, e.g., 12d/20d and 12b/20b in this example, by using one or more shims of desired thickness between the bearing plate assembly and the reference bar. The bearing plate assembly is then torqued down to the designed load. The shims are subsequently removed once the gap is set. This techniques is referred to as "adjusting for clearance". Removal of the shims can be difficult. The adjacent face pairs 12a/20a and 12c/20c are set by grinding the clearances into the parts' sizes.

Turning now to FIG. 2, the bearing plate assembly 16 is shown as it would be slidably mounted on reference bar 10. A weight or load (not shown) will be supported by bearing plate 16, for example.

Normally, as is well known to those of ordinary skill in the art, bearing plate assemblies include air bearing manifolds on their interfaces which permit air (or another suitable gas or liquid fluid) to pressurize the gap between reference bar 10 and bearing plate assembly 16 providing for low-friction operation.

By attaching equipment to bearing plate assembly 16, the equipment may be rapidly and easily positioned over a work surface or as otherwise desired with low levels of power needed to overcome the low friction of the bearing assembly and resulting in very low wear and tear on reference bar 10 and bearing plate assembly 16. Such systems are used, for example, in coordinate measuring machines, lithography instruments, automatic assembly machines and in pick-and-place systems used for electrical and electronic manufacturing.

As pointed out above, to achieve low friction in such structures, it is necessary to machine not only the outer surfaces 12a, 12b, 12c and 12d of the reference bar 10 to extremely high precision (typically the surface finish will be specified as smooth to within 0.1 microns and the precision of the angles between adjacent surfaces, e.g., angles 14a–14d, will be specified as +/−0.006°) but also the corresponding respective surfaces 20a, 20b, 20c and 20d of the bearing plate assembly 16 need to be machined to high precision (typically the inner surface of bearing plate assembly 12 will be specified as flat to within 0.5 micron and the precision of the supplementary angles between corresponding pairs of adjacent bearing plates is specified as +/−0.0006°). It may also be the case that the reference bar is external to the bearing plate assembly.

While such high precision machining operations yield extremely good results, they do so at relatively high cost which precludes the use of such bearing plate assemblies in lower cost equipment and in many applications which could benefit from the use of such assemblies. Such assemblies are also difficult to repair if the reference bar or bearing plate assembly becomes marred (e.g., due to air supply failure or other mishap).

Low cost approaches to the formation of high precision bearing assemblies have to overcome a number of key issues in order to provide adequate performance. First, bearing plate surfaces 20a, 20b, 20c and 20d must be flat and smooth (typically 0.5 and 0.1 micron or better, respectively) and parallel (typically 1.0 micron or better) with respect to corresponding respective reference bar surfaces 12a, 12b, 12c and 12d. Second, the angles formed between adjacent bearing plate surfaces, i.e., angles 22a, 22b, 22c and 22d, must match corresponding respective reference bar angles 14a, 14b, 14c and 14d with a precision of 0.0006° or better. Third, the manufactured gaps 26a, 26b, 26c and 26d must be precisely and repeatedly matched to designed gaps with a precision of 1 micrometer or better in order to assure designed system stiffness and load capacity.

Some prior systems utilize resin materials such as epoxy to replicate bearings surfaces, and to replicate ways surfaces. In such systems, a rigid tube or rail structure is usually employed to support a plurality of precision bearing pads which are glued to the structure. One technique has been used to align bearing surfaces within fixed alignment frames, such that the bearing surfaces are made parallel to the ways surfaces on the cure of a resin material, but in that method, there does not appear to be a satisfactory means for precisely adjusting the gap between the ways bar and the sliding assembly. For example, U.S. Pat. No. 5,488,771 to Devitt, et al., entitled "Method for Manufacturing Pressurized Bearing Assembles" describes a class of bearing structures like this. In FIGS. 3–4, a bearing assembly 30 is depicted. FIG. 4 shows an exploded view of bearing assembly 30 which includes a reference bar assembly 32 and a slider 34. Air (or other liquid or gas fluid) pressurized precision machined bearing pads 36a through 36k are glued to reference bar 38 and provide a low friction engagement with corresponding surfaces of slider 34. In accordance with the invention, epoxy is injected to glue the bearing pads 36a through 36k to the reference bar 38 while a vacuum is pulled on the bearing pads to urge them against corresponding surfaces of slider 34. Afterwards, fluid pressure is applied to the bearings pads to force them away from slider 34 so as to form a gap. As an alternative, thin shim stock with holes is placed in the gap and a vacuum is continuously pulled. Upon curing, the pads are pressurized and the shim stock removed leaving a desired gap. Other known systems depend upon precise shrinkage of a resin material during the curing process to set the gap. While suited for their intended purposes, such systems, when damaged, have proven difficult to repair because disassembly of the slider assembly is difficult.

Accordingly, there is a need for a bearing plate structure which can be fabricated for reduced cost with reduced necessity for high precision machining of parts in order to match supplementary angles.

SUMMARY OF THE INVENTION

A class of bearing plate structures for slidable engagement with a reference bar include a plurality of plates each having a precision machined surface for sliding engagement with a corresponding precision machined surface of the reference bar. The use of a curable hardening bonding material to attach adjacent portions of the plates together allows angles between adjacent plates and the operating gap between the bearing plate structure and the reference bar to be easily set and fixed with reference to the reference bar.

OBJECTS AND ADVANTAGES OF THE INVENTION

Accordingly, it is an object and an advantage of the present invention to provide an improved bearing plate structure for slidable engagement with a reference bar.

It is another object and advantage of the present invention to provide a reduced-cost apparatus and method of manufacturing for a bearing plate structure for slidable engagement with a reference bar.

These and many other objects and advantages of the present invention will become apparent to those of ordinary skill in the art from a consideration of the drawings and ensuing description of the invention.

DETAILED DESCRIPTION OF A PREFERRED EMBODIMENT

Figure 1:
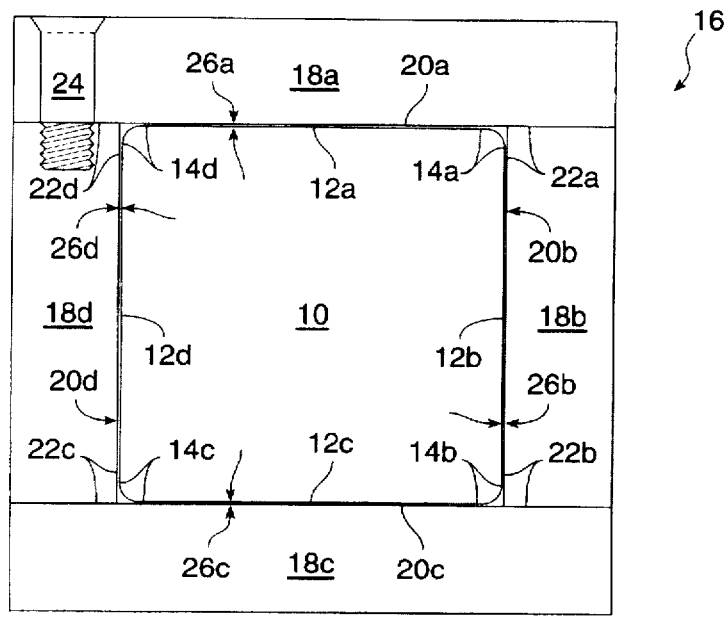
FIG. 1 is an end section of a bearing plate structure constructed around a reference bar of square cross section in accordance with the prior art.
Figure 2:
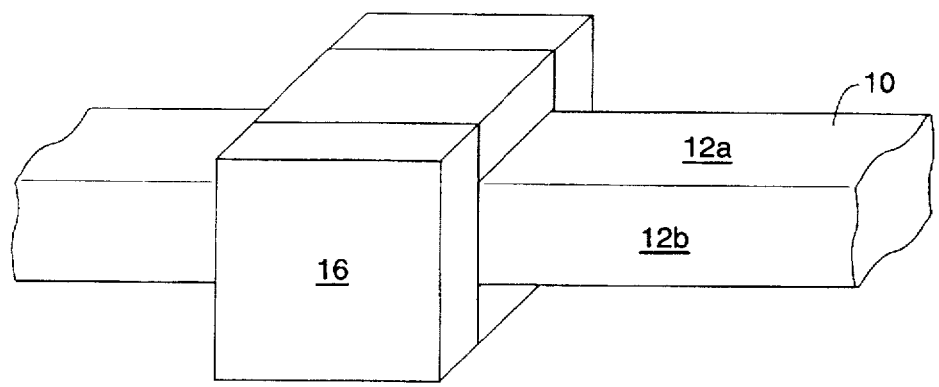
FIG. 2 is a front right side perspective view of a bearing plate structure constructed around a reference bar of square cross section in accordance with the prior art.
Figure 3:
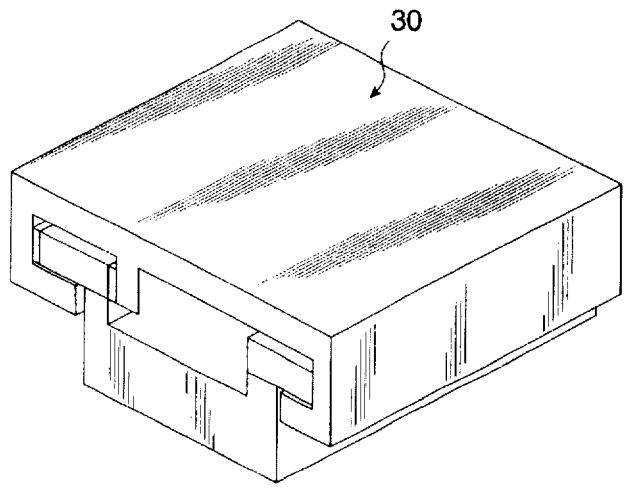
FIG. 3 is a front right side perspective view of a prior art bearing structure without guide ways bar.
Figure 4:
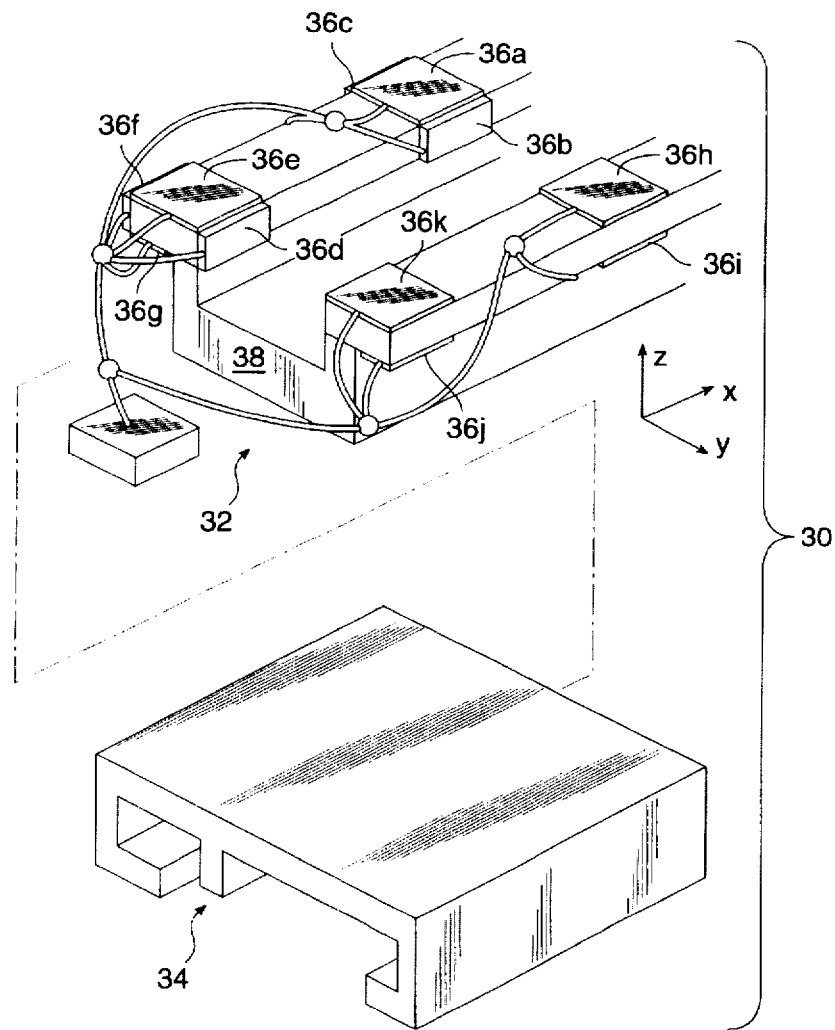
FIG. 4 is an exploded view of a prior art bearing structure.

Those of ordinary skill in the art will realize that the following description of the present invention is illustrative only and is not intended to be in any way limiting. Other embodiments of the invention will readily suggest themselves to such skilled persons from an examination of the within disclosure.

In accordance with the present invention, methods and structures are provided which allow the construction of sliding devices that must be very precisely aligned and which must be adjusted to very precise gaps or clearances from reference surfaces to be assembled from components that have a minimum of precisely matched surfaces. It requires only one set of surfaces, usually the longitudinal surfaces of the reference bar, to be precisely machined with respect to parallelism or the desired precision of the reference angles between adjacent faces, and that the other components be machined only to perform their functions of delivery of lubricant, where a lubricant is used (i.e., as through a pressure manifold), and to be flat enough for their function on the faces that oppose the longitudinal surfaces of the reference bar (also known as "ways surfaces"), and that they be of materials that can be bonded, and optionally, fastened with conventional fasteners (such as, for example, bolts and similar conventional fasteners). The supplements of the external angles of adjacent faces of the ways members are created on the sliding members by placing bonding material between the edges of face plates such that the thickness of the bonding material is not so much as to create a significant thickness change by shrinkage during curing, and then by fasteners or external clamping devices holding the plates in contact with the way faces and the butted edges of the plates of the sliders in contact with the adjacent inside faces' surfaces until the curable bonding material is cured enough to permit the respective sliding members to be adjusted to provide precisely aligned gaps between the slider and the ways, and then be refastened with supplementary angles still matched.

The primary advantage of this approach is that it does not require that the edges of the plates that butt the inside faces of the sliders be machined to the complimentary angles of the ways surfaces, but rather that this expensive process can be replaced by utilization of a curable bonding material which cures to a rigid and durable surface, effecting the supplementary angles between the edge-butted plate and the adjacent face with respect to the associated pair of ways surfaces.

A secondary advantage of this approach is that it does not depend on a very precise shrinkage of resin or bonding material during a curing process, or of the contraction or expansion of materials with different coefficients of expansion, one to another, or in series, to generate a gap between mated faces or components, although it could be used in tandem with such a method, where desired.

This approach may also be used where the members called plates could be built up of multiple components of two or more plates, bars, or sections, and where the curable bonding material is used to achieve the alignment of the bearing faces, which are the inside faces, to the ways surfaces.

An additional advantage of this approach is that the performance of the system should be highly reproducible, in contrast to systems where material shrinkage or deformation is required to set the gap, and where such resultant gaps may vary considerably from one example to the next in production practice.

The advantage of having precisely adjusted gaps allows simple high stiffness hydrostatic, hydrodynamic and aerostatic versions of bearings to be set to their gaps that optimize performance, and to do this without having to grind the supplementary angles precisely to match angles of the reference ways. It is sufficient that the precision surfaces merely be flat enough for their bearing functions. The dynamic phenomenon of squeeze film damping may be optimized when the bearings' surfaces, e.g., the slider surfaces are parallel to the ways' surfaces, and this is more easily achieved when the butted edges have angles to their adjacent bearing faces that are supplementary to the ways' adjacent faces surfaces.

For externally pressurized bearings with fixed flow restriction in a slide system there will always be an optimal nominal gap at which there is an optimum pressure drop, delivering the desired balance between damping and stiffness characteristics by design. The structures and methods shown herein allow for setting that gap by conventional means of adjustment (as with entirely precisely machined bearings and reference bars), and allow that gap to be uniform over the bearing surfaces, without precisely machining matching angles on sliders to match adjacent faces' angles on the ways' surfaces. Even for systems that have a compensating regulation system between opposed bearing faces, or servoed for individual faces, the angular matching allows parallelism between bearings faces to be achieved more easily, without any requirement for articulated pad bearings.

Figure 5:
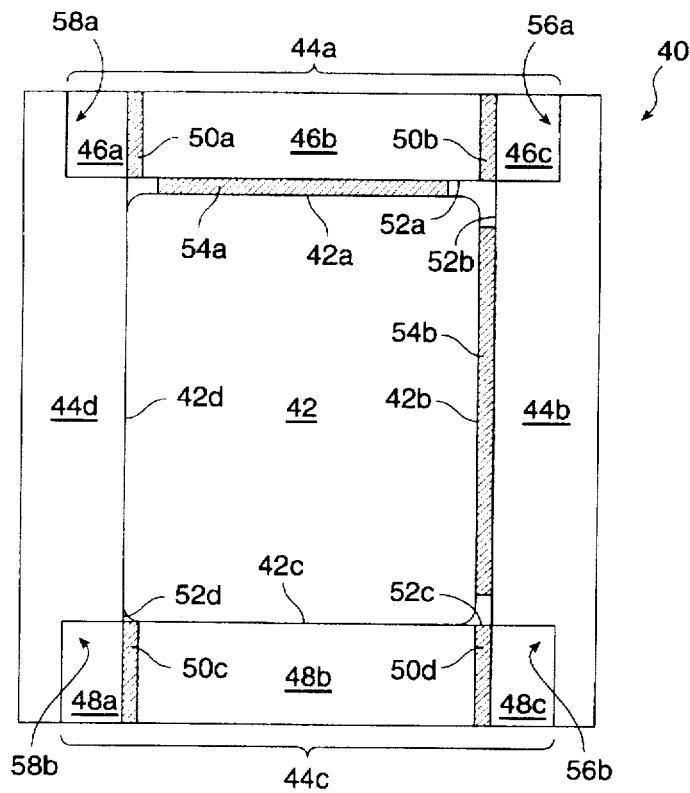
FIG. 5 is a sectional view showing a bearing plate structure according to another preferred embodiment of the present invention assembled about a reference bar.

A first preferred embodiment of the present invention is depicted at FIG. 5. Referring to FIG. 5, a box-type plate bearing assembly or slider 40 surrounds a reference bar 42. Reference bar 42 is precisely machined to desired tolerances. Typically this would be to a surface finish of 8 microinches, parallelism of opposite sides of 0.000040 in, angles of adjacent sides to within 0.003° of specified. Slider assembly 40 is assembled and slides along reference bar 42. The reference bar 42 is ground to desired tolerances for parallelism of opposing sides and angles between adjacent sides. Slider 40 comprises slider plates 44a, 44b, 44c and 44d. Plates 44a and 44c oppose one another as shown and are fabricated, respectively, of members 46a, 46b, 46c and 48a, 48b, 48c. Curable bonding agent layers at 50a, 50b, 50c and 50d allow sliding surfaces 52a, 52b, 52c and 52d to adjust for parallelism to corresponding reference bar surfaces 42a, 42b, 42c and 42d. Shims 54a and 54b are twice as thick as desired gaps between surfaces 52a & 42a, 52c & 42c and 52b & 42b, 52d & 42d, respectively. By clamping the plates 44a, 44b, 44c and 44d tightly about reference bar 42 while curable bonding agent layers 50a, 50b, 50c and 50d cure, precise alignment is achieved. The rabbets 56a, 56b, 58a, 58b, respectively in plates 44b and 44d should be milled or ground to a reasonable angular match to minimize distortion of adjacent bearing surfaces on assembly with corner parts 46a, 46c and 48a, 48c, but do not need to be ground for supplementary angular precision with respect to reference bar 42, for the angles are made (matched) in the cure of bonding agent layers 50a, 50b, 50c and 50d.

Fasteners, not shown, but similar to those shown in FIG. 1 at 24, are employed to secure the plates together. Removal of the fasteners permits disassembly of the slider 40 so as to permit removal of shims 54a, 54b after curing of curable bonding agent layers 50a, 50b, 50c and 50d. Upon refastening, the slider assumes the desired shape with desired gaps one half the thickness of the corresponding shims.

Figure 6:
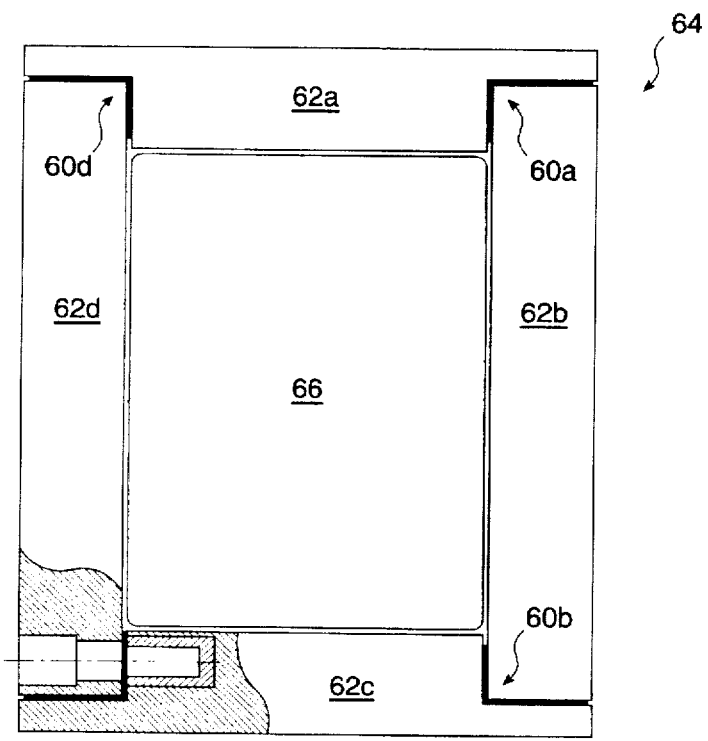
FIG. 6 is a sectional view of a bearing plate and reference bar structure according to another preferred embodiment of the present invention.

Another preferred embodiment of the present invention is shown in FIG. 6. In accordance with this embodiment, a layer of a curable bonding agent together with a layer of a release agent is used on internal joints 60a, 60b, 60c and 60d to hold together plates 62a, 62b, 62c and 62d of slider 64 about reference bar 66. Each joint is also pinned and bolted by conventional fasteners. By using curable bonding agent to further constrain the plates while the bonding agent is curing so that the angular relationships as well as the average spacing of the plates with respect to reference bar 66, and to each other are more securely and rigidly established. In this embodiment, it is preferable to employ resins having the lowest available shrinkage upon curing in corner joints 60a, 60b, 60c and 60d. Gaps may be defined by using a pair of shims (not shown) as discussed above. In this embodiment, however, a preferred way to remove the shims is by parting a pair of opposed joints (say, 60d and 60b) which will allow easy removal of shims. Then the plates may be repositioned around reference bar 66 without re-shimming, but according to the desired gap and parallelism due to the reference planes created by cured bonding agent. This approach preserves not only the angles between abutting plates, but the width and height spacing relationships as well.

Figure 7:
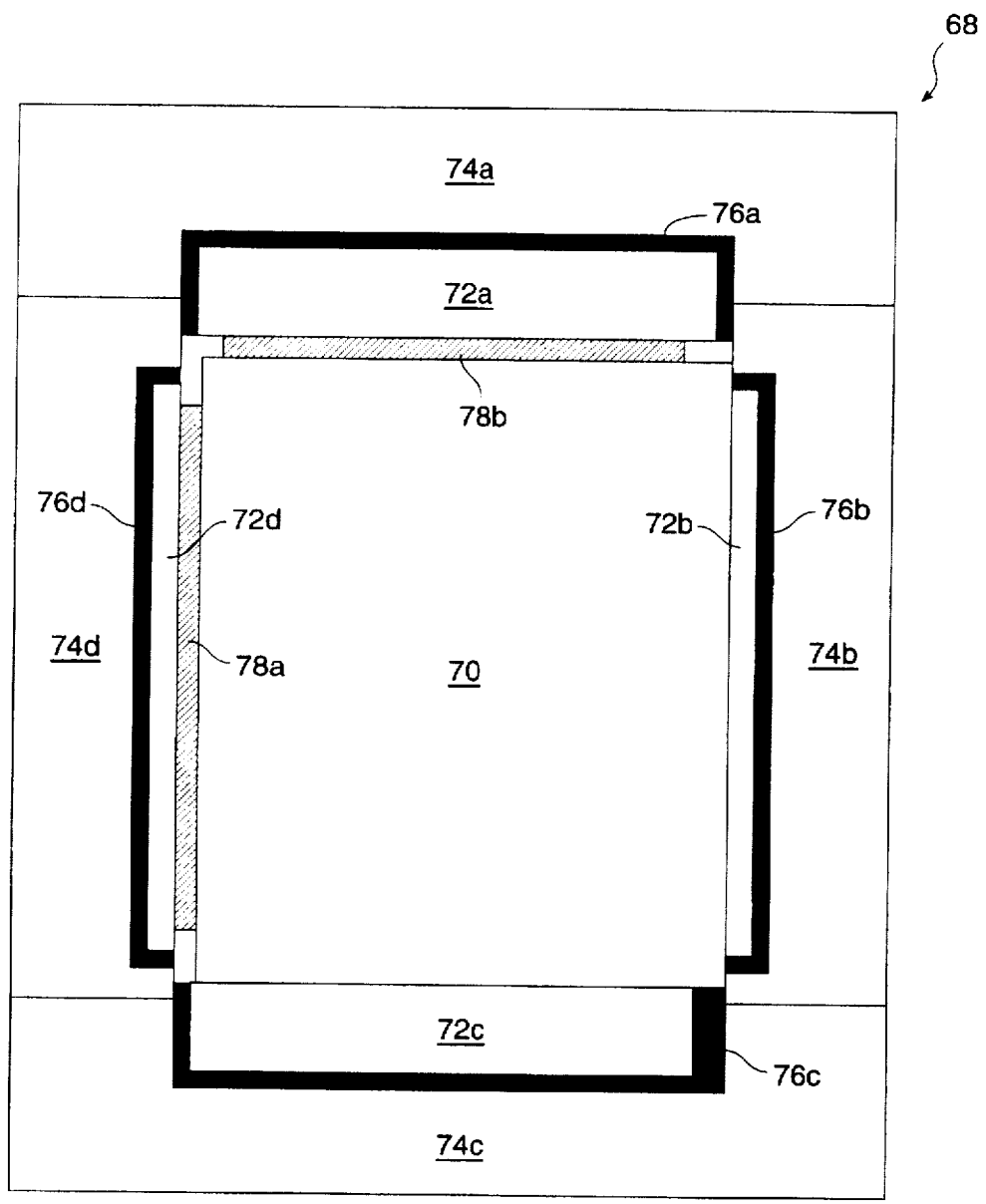
FIG. 7 is a sectional view of a bearing plate and reference bar structure according to another preferred embodiment of the present invention.

The slider 68 about reference bar 70 of FIG. 7 is a variation of the FIG. 6 embodiment wherein bearing pad inserts 72a, 72b, 72c and 72d are supported within bearing plates 74a, 74b, 74c and 74d by curable bonding agent layers 76a, 76b, 76c and 76d so as to set the angles. Plates 74a, 74b, 74c and 74d are fastened by conventional fasteners (not shown). Double thickness shims 78a, 78b are used to set the gaps. The slider 68 is disassembled after curing, the shims easily removed, and after reassembly, the desired gaps are automatically set.

Curable Bonding Material

Curable bonding materials or bonding agents as contemplated by the present invention include binary epoxy compounds and other curable resins. Such compounds are well known to those of ordinary skill in the art and are sold under a wide variety of commercial product names. Note also that it will often be advantageous to incorporate o-ring type seals about fasteners and string-type seals in the vicinity of the curable bonding agent so as to constrain its seepage from areas not desired to be bonded. The use of such devices is well known to those of ordinary skill in the art.

Fluid Bearings

As used herein, the fluid bearings or fluid film bearings are intended to include gas-type bearings as in air bearings, liquid bearings, and mixed phase liquids with particles, as well known by those of ordinary skill in the art.

Floating Preloading Elements

A number of known systems employ floating preloading elements to preload bearing members which are in fixed gap or servo-gapped relationship to the reference bar or ways. In such systems, the gap is set by the preloading element, rather than by shims. The above-described inventions may also be used with preloading element derived gaps rather than shim-set gaps. Such preloading may be effected by known means, such as by air or fluid pressure (positive or negative), magnetic force, spring force, etc.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be restricted except in the spirit of the appended claims.

What is claimed is:

1. A slider for sliding engagement with a reference bar having a plurality of longitudinal references surface, said slider comprising:

a first member having a slider surface for sliding engagement with one of the longitudinal reference surfaces;

a second member to which said first member is bonded with a layer of a curable bonding material; and a third member to which said second member is removably attached so as to permit disassembly of said slider.

2. A slider for sliding engagement with a reference bar having a plurality of longitudinal references surface, said slider comprising:

a first member having a slider surface for sliding engagement with one of the longitudinal reference surfaces;

a second member to which said first member is bonded with a layer of a curable bonding material;

a third member to which said first member is bonded with a layer of curable bonding material;

a fourth member to which said second member is removably attached so as to permit disassembly of the slider; and a fifth member to which said third member is removably attached so as to permit disassembly of the slider.

3. A reference bar and bearing plate structure for supporting equipment to be moved along a length of said reference bar, said structure comprising:

a reference bar of constant, generally rectangular cross section, having four longitudinal faces; and a bearing plate structure assembled about said reference bar and including first, second, third and fourth bearing plates, said first and third bearing plates including a first member, a second member and a third member, said first member attached to said second member with a first layer of a curable bonding material and said first member attached to said third member with a second layer of a curable bonding material, said second bearing plate removably fastened with fasteners to said first bearing plate and said third bearing plate and said fourth bearing plate fastened with removable fasteners to said first bearing plate and said third bearing plate.

4. A bearing plate and reference bar structure comprising:

a reference bar of constant, generally rectangular cross section, along its length; and a bearing plate structure for supporting equipment to be moved along said length of said reference bar, said bearing plate structure including:

first, second, third and fourth bearing plates, each of said bearing plates contacting two abutting bearing plates at a rabbet joint, a layer of curable bonding material attaching said respective bearing plates at said rabbet joints.

5. A bearing plate and reference bar structure comprising:

a reference bar of constant, generally rectangular cross section, along its length; and a bearing plate structure for supporting equipment to be moved along said length of said reference bar, said bearing plate structure including:

first, second, third and fourth bearing plates, said first and third bearing plates each formed of three pieces and two layers of curable bonding material joining said three pieces into said respective first and third bearing plates, said first bearing plate in abutting contact with said fourth bearing plate and said second bearing plate, said third bearing plate in abutting contact with said second bearing plate and said fourth bearing plate.

* * * * *